Nov. 15, 1966  G. F. DAVIES ET AL  3,285,714
REFRACTORY METAL COMPOSITE
Filed April 2, 1963
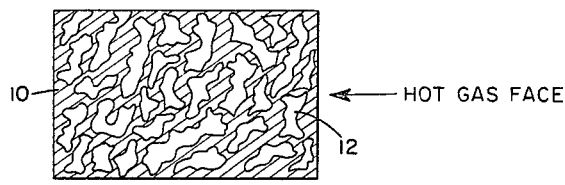
FIG.1
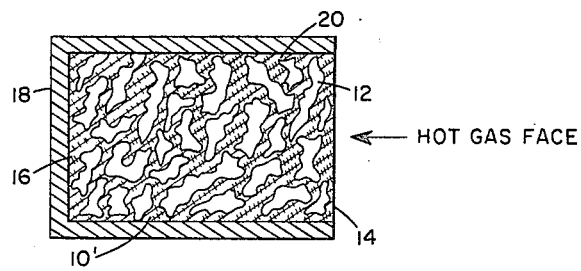
FIG.2
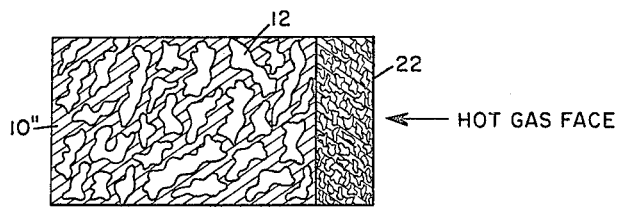
FIG.3
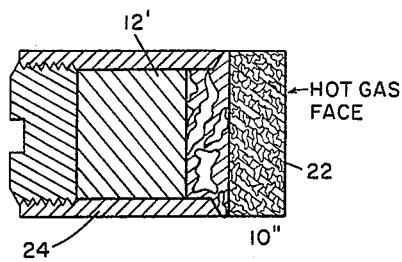
FIG.4
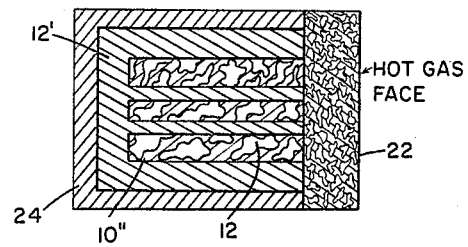
FIG.5
INVENTOR.
GAIL F. DAVIES
WALTER E. SMITH
BY
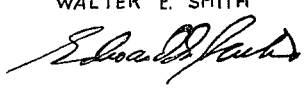
ATTORNEY

United States Patent Office 3,285,714
Patented Nov. 15, 1966

3,285,714
REFRACTORY METAL COMPOSITE
Gail F. Davies, Mentor Township, and Walter E. Smith, South Euclid, Ohio, assignors to Clevite Corporation, a corporation of Ohio
Filed Apr. 2, 1963, Ser. No. 270,111
13 Claims. (Cl. 29—182.1)

This invention relates generally to a structural material and more particularly to a refractory material adapted to be employed in high temperature applications such as for rocket nozzle linings and the like.

The need for new materials able to withstand the ultra high temperatures encountered in the propellant gases generated during the combustion of newly developed rocket fuels is well known and urgent.

The present invention is based on the concept of absorbing thermal energy both in the heat-up and the change of state of a material to facilitate the employment of a refractory metal matrix at temperatures above its melting point for a controlled length of time without loss of shape or dimension.

The invention utilizes a permeable matrix material permeated with infiltrants having a relatively high total heat capacity and a phase change temperature from solid to liquid and from liquid to gaseous vapor permitting performance of the matrix material in conditions above the melting point of the infiltrant. Basically, this result is achieved because large quantities of thermal energy imparted to the matrix are absorbed by the infiltrants so that the temperature of the infiltrated body is not elevated above the boiling point of the infiltrants until the infiltrants are completely evolved. This process, in accordance with this invention, is progressive and at one time three states of infiltrants will co-exist in the matrix material, namely, solid, liquid and vapor.

It is therefore, the broad, fundamental, object of this invention to provide a new refractory structural material based on and functioning in accordance with the above outlined basic concept of this invention.

In a more specific sense, it is an object of this invention to provide a permeable body having interconnecting voids to permit a uniform distribution of the infiltrants throughout the matrix body. It should be noted, that the mere porosity of given matrix body is not sufficient to accomplish the objectives of this invention since a "porous" body, as distinguished from a permeable body, does not have interconnecting passageways so that an efflux of all infiltrants toward the hot gas surface cannot be accomplished.

It is a further object of this invention to provide a refractory material in which the relationship of the pore size of the permeable body to the meniscual forces of the infiltrant in its liquid state is controlled, to effect retention of the infiltrant within the pores until vaporization takes effect, thereby taking advantage of the latent heat of vaporization, i.e., the point at which the maximum thermal energy is absorbed.

It is another object of this invention to provide a refractory material including a permeable matrix and a high volume percent of the infiltrants in the matrix; and to improve and/or maintain the structural coherence of the matrix by fiber reinforcement thereof.

It is another object of this invention to provide a reservoir of infiltrants, disposed in various ways, and in which the efflux of the infiltrants is controlled by a micro porous overlay structure which acts in essence of a valve limiting evolution of infiltrant vapor.

These and further objects are accomplished by a novel refractory composite structure, in accordance with this invention, which comprises a matrix of a given refractory metal having a melting point of not less than 2400° F. and a permeability of greater than about 2 "Darcy's" and less than about 18 "Darcy's"; and an infiltrant material of a different metal which has a boiling point lower than the melting point of the matrix metal and which is infiltrated through the matrix to fill the voids thereof, the infiltrants in the matrix compose about 5 to 45 percent of the volume of the composite structure.

For a better understanding of the present invention, together with other and further objects thereof, reference is had to the following description taken in connection with the accompanying drawings, and its scope will be pointed out in the appended claims.

FIGURE 1 is a pictorial representation on a greatly enlarged scale of a refractory material, shown in section, according to this invention, illustrating a permeable infiltrated body;

FIGURES 2 to 5 are views similar to FIGURE 1, additionally FIGURE 2 shows an infiltrant retaining structure; and FIGURE 3 shows a dual permeability structure; and FIGURES 4 and 5 are modifications of FIGURE 3 illustrating a dual permeability structure and a reservoir for retaining the infiltrants.

The term "Darcy" is commonly used in this art and has a numerical relationship to the degree of permeability. See Arthur Adamson, "Physical Chemistry of Surfaces," New York, Inter-Science Publishers Inc., pp. 444–448, 1960, and A. E. Scheidigger, "The Physics of Flow Through Porous Media," MacMillan, pp. 69–77, 1960.

Referring now to FIGURE 1 there is shown a powder metal matrix 10 composed of particles selected from a group of refractory metals such as tungsten, hafnium, titanium, molybdenum, zirconium, columbium, tantalum, chromium, and super alloys thereof.

The matrix, as prepared, has a permeability in the range of about 2 to 18 Darcy's depending upon the thermal energy requirements, rate of efflux etc. and a density of 55 to 90 percent relative to theoretical density. The voids or pores of the matrix are uniformly distributed throughout the matrix and range in size from 1 to 100 microns. The preferred embodiment has a relatively uniform pore size of about 5 microns. The matrix may be established in the form of a compacted and sintered body or a fibrous mat.

The matrix body 10 is infiltrated with a suitable infiltrant material 12 such as lithium, copper, silver, manganese and alloys thereof, also Teflon and other high heat capacity organic material. The combination of a powder tungsten matrix infiltrated with copper infiltrants exhibits particularly favorable characteristics. The infiltrants 12 filling the voids, or pores, of the matrix 10 comprise about 5 to 45 percent of the volume of the composite structure. As is evident from the list of suitable materials for infiltrants, the infiltrants are of a different metal than the matrix metal and, moreover, the infiltrant material must have a boiling point lower than the melting point of the matrix metal.

FIGURE 2 illustrates a variant of the invention discussed in the preceding paragraphs. The front face 14 has been designated hot gas face and the balance of the outer surface of the matrix 10' is herein referred to as the "back face" 16.

An infiltrant retaining structure 18 composed of nonporous tungsten or other refractory material surrounds the back face 16 of the matrix 10'. The retaining structure, also referred to as a non-porous overlay, is cohesively attached to the back face of the matrix. Preferably, a solid state bonding process is used to facilitate proper diffusion between the metals so as to avoid voids toward which the infiltrants can escape and evolve. As a result, when heat is applied to the front face, the infiltrants will evolve towards the front face which is of course the area where they are most effective. It is necessary that the overlay is composed of a refractory material of the type above named as matrix candidates and that the melting point is above the boiling point of the infiltrants.

FIGURE 2 also illustrates a fiber-reinforcement, see 20, of the matrix 10'. For details on the subject of fiber re-inforcement see co-pending application Serial No. 315,564, filed October 11, 1963, which is a continuation of Serial No. 822,838, now abandoned, assigned to the same assignee as the instant invention. The fibers 20 are preferably discontinuous and are substantially uniformly distributed through the matrix 10' and individually bonded thereto. Fiber re-inforcement of the matrix increases the strength and thermal-shock resistance of the matrix at any given density and thus is particularly useful in the lower regions of density when a higher percentage of infiltrants are utilized.

In FIGURE 3 there is shown a dual permeability matrix. The matrix 10'' of FIGURE 3 is substantially identical with the matrix described in regard to FIGURE 1. A second matrix 22 is diffusion bonded to or may be an integral part of the first matrix 10''. The matrix 22 is composed of a refractory material selected from the group above named. The second matrix may also be deemed a permeable overlay although, depending upon the structural characteristics desired, the second matrix can be very thin walled. Thus for instance, an overlay structure consisting of compacted material having a pore size of 1/10 to 10 micron, a density of 75 to 95 percent of theoretical density, a permeability in the range of 1 to 6 darcys and a thickness of .005'' to .200'' has shown superior characteristics.

A pore size differential between the matrices is preferably retained. Therefore, in this embodiment, the matrix 10'' has a pore size of 20 to 100 microns and a permeability in the range of 6 to 18 darcys. An optimum relationship in tungsten between the two mean pore sizes may be characterized at the ratio of 1 to 15 where copper is the infiltrant.

FIGURES 4 and 5 are further modifications of the basic invention. In both instances a dual permeable structure is used as described in the preceding paragraphs with respect to FIGURE 3. In FIGURE 5 the matrix 10'' having the larger pore size is in the form of thermal-conductive risers which extend into a storage container 24, for reasons which hereafter will become more apparent.

The container is composed again of non-porous refractory material with a melting point above the boiling point of the infiltrant. Additional infiltrants 12' are stored within the container and are thermo conductively arranged with respect to matrix 10''.

In operation when the composite material is used for instance as a rocket nozzle liner, it is exposed to a high temperature on one surface. The heat is conducted inward through the matrix and the infiltrants contained in the pores and causes a thermal gradient to be established from the hot surface inward. As the temperature increases a state is reached at which the infiltrants progressively change from solid to liquid. As additional thermal energy is applied the liquid then becomes vaporous. As a result, there are contained within the pores three states of infiltrant, solid, liquid, and vapor, the last mentioned being closest to the high temperature surface. The infiltrant during these three stages of operation absorbs thermal energy and eventually upon reaching the boiling point the body will stabilize the composite structure at that temperature until the infiltrants have been completely utilized. This is generally referred to as a thermal plateau or arrest generated by the infiltrant.

As a variation of this general concept and to prevent the possible loss of material on the back face of the matrix the back face of the structure is sealed off so that the infiltrant upon absorbing sufficient thermal energy is forced to evolve to the hot gas face. See FIGURE 2.

We further control the relationship of the liquids to the surface to prevent the inadvertent melting out of the infiltrant at the surface before the infiltrant has reached the boiling point. See the dual permeability structure of FIGURES 3 to 5. In this modification a coarse pore matrix and a relatively fine pore structure are utilized to attain optimum strength and storage characteristics. The smaller diameter pore 22 requires greater energy on the part of the infiltrants to evolve than is required with the coarse pores. In consequence the thermal absorption efficiency of the infiltrant is raised considerably.

The method for manufacturing the refractory composite described above utilizes in many respects conventional powder metallurgy methods, others are specifically explained. Thus suitable powder particles are selected, the criteria for which depends in part on the pore diameter desired and the sintering conditions utilized. The same applies when instead of powder, a metal powder fiber re-inforced matrix is utilized.

A predetermined mass of powder particles are placed into a graphite die to fill a predetermined volume for establishing the desired end product density. The refractory powder particles are sintered, under pressure, at a temperature in the range of 1850° to 2500° C. in a partial vacuum containing a mixture of about 7% hydrogen and 93% argon for a period of approximately one-half to one hour. Conventional hot-pressing procedure is used and adequate pressures are applied to attain a predetermined mass to volume ratio and the desired permeability. The individual techniques are described in U.S. Patent No. 2,997,777, issued August 29, 1961, and assigned to the same assignee as the instant invention.

The matrix is then infiltrated by first placing same into a furnace to evacuate and remove all oxidizing and entrapped gases by subjecting the matrix to an atmosphere of 93% argon and 7% hydrogen. The matrix is then heated to a temperature above the melting point of the infiltrant and the infiltrant is allowed to permeate the matrix. Normally the infiltrant is placed in a strategic position with reference to the thickness of the section and in such a fashion that gravity flow can be utilized and that the shortest path for total permeation is available. If the permeability or surface access to pores is good the structure is adequately infiltrated. With certain types of infiltrants such as silver, addition agents are sometimes desirable to facilitate wetting and thereby bring about a more rapid and effective flow of the infiltrant through the fine pore structure.

The invention as embodied in FIGURE 2 is produced in similar manner, with the following exceptions. The die cavity is pre-lined with, for instance, a thin tungsten sheet, 5 to 10 mil is satisfactory, and the powder particles are placed in and against the lined cavity. Prior to the insertion of the retaining structure 18 in the cavity, the sheet has been chemically cleaned and prepared to assure adequate diffusion bonding between the structure 18 and matrix 10'.

Relative to the embodiment of FIGURES 3 to 5 it should be noted that the dual permeability structure is produced substantially in the same way as aforedescribed. Graphite dies are utilized which are of a typically stop-gap construction. Two preselected powders are charged to the die, the material to produce the coarse permeable matrix 10'' is charged first and adjusted by weight volume ratio to permit the production of a predetermined body dimension. This is followed by the charging of a fine powder typically (50%) 1 micron, (50%) 10 micron powder blended and adjusted by weight. The "fine pore" mixture as produced is charged onto the coarse pore matrix and "doctored" to produce a level face. The die assembly is then provided with a punch and charged in the furnace for subsequent hot pressing.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A refractory composite structure, comprising: a first permeable matrix of a given refractory metal having uniformly distributed pores of a size ranging between 1/10 to 10 microns and a predetermined degree of permeability; a second permeable matrix of a given refractory metal having uniformly distributed pores of a size ranging from 20 to 100 microns and a comparatively lower degree of permeability; said first and said second matrix being metallurgically bonded together; infiltrants in a solid state composed of materials selected from the group consisting of lithium, copper, silver, manganese and tetrafluoroethylene, at least said second matrix being infiltrated with one of said infiltrants; said first matrix having a permeability effective to establish a control valve to permit the efflux of the solid infiltrants in vapor form only upon exposure of the composite to a predetermined temperature; and a plurality of discontinuous fibers of a refractory material uniformly distributed through said second matrix and substantially individually bonded to said matrix.

2. A refractory composite structure according to claim 1, and a nonporous overlay encapsulating the second matrix except for the contact area between said matrices, said overlay being metallurgically bonded to said second matrix.

3. A refractory composite according to claim 1, wherein both of said matrices are infiltrated.

4. A refractory composite structure according to claim 1, characterized in that the first and second matrix material is composed of sintered metal powder particles selected from the group consisting of tungsten, hafnium, titanium, molybdenum, columbium and tantalum.

5. A refractory composite structure according to claim 1 wherein the infiltrants in said second matrix comprise about 5 to 45% of the volume of the structure.

6. A refractory composite structure, comprising: a first permeable matrix of a given refractory metal having uniformly distributed pores of a size between 1/10 to 10 microns; a second permeable matrix of a given refractory material having uniformly distributed pores of a size ranging between 20 to 100 microns, said first and said second matrix being metallurgically bonded together; said refractory metals being selected from a group of materials consisting of tungsten, hafnium, titanium, zirconium, chromium, molybdenum, columbium and tantalum; solid infiltrants stored in close proximity to at least one of said matrices, said infiltrants having a boiling point lower than the melting point of the matrix material and being selected from a group of materials consisting of lithium, copper, silver, manganese and tetrafluoroethylene; said first matrix constituting a porous hot gas face effective as a valve to control the efflux of said infiltrants in vapor form upon exposure of the composite to a predetermined temperature.

7. A refractory composite structure according to claim 6, and a storage container of nonporous material backing up at least one of said matrices, and wherein said infiltrants are stored in said container.

8. A refractory composite structure according to claim 7, characterized in that said second matrix includes a plurality of thermo conductive risers extending into said container.

9. A refractory composite structure according to claim 6, wherein at least one of said matrices is infiltrated with infiltrants.

10. A refractory composite structure according to claim 6, and a plurality of discontinuous fibers of a refractory material uniformly distributed through said second matrix and substantially individually bonded to said matrix.

11. A refractory composite structure according to claim 9, and a plurality of discontinuous fibers of a refractory material uniformly distributed through said second matrix and substantially individually bonded to said matrix.

12. A refractory composite structure according to claim 9, and a nonporous overlay encapsulating the second matrix except for the contact area between said matrices, said overlay being metallurgically bonded to said second matrix.

13. A method of forming an infiltrated refractory structure, comprising: preparing a first powder having a relatively fine particle size and preparing a second powder having a comparatively coarse particle size, said powders being of a metal selected from a group of refractory metals consisting of tungsten, hafnium, titanium, zirconium, chromium, molybdenum, columbium and tantalum; placing each powder sequentially in a suitable die; hot pressing said powder simultaneously and in a direction perpendicular to the interface of said matrices to effect a composite matrix with a permeability of a comparatively different value in each matrix which changes abruptly at the interface between the matrices; placing an infiltrant selected from a group of metals consisting of lithium, copper, silver, manganese and Teflon in contact with said composite matrix; evacuating said matrix; thereafter heating said matrix to a temperature above the melting point of said infiltrant to permeate the matrix therewith.

References Cited by the Examiner

UNITED STATES PATENTS

| | | | |
|---|---|---|---|
| 2,179,960 | 11/1939 | Schwarzkopf | 29—182 |
| 2,573,229 | 10/1951 | Stern | 75—200 |
| 2,581,252 | 1/1952 | Goetzel | 75—200 |
| 2,845,346 | 7/1958 | Scanlon et al. | 75—200 |
| 2,946,680 | 7/1960 | Raymont | 75—200 |
| 3,069,847 | 12/1962 | Vest | 60—35.6 |
| 3,084,421 | 4/1963 | Daniels et al. | 29—182.1 X |
| 3,107,418 | 10/1963 | Gorman | 29—182.1 X |
| 3,114,197 | 12/1963 | DuBois et al. | 29—182.2 |
| 3,115,746 | 12/1963 | Hsia | 60—35.6 |
| 3,125,441 | 3/1964 | Lafferty et al. | 75—200 X |
| 3,138,009 | 6/1964 | McCreight | 29—182.2 X |
| 3,145,529 | 8/1964 | Maloof | 29—182.1 X |

FOREIGN PATENTS 881,204  11/1961  Great Britain.

OTHER REFERENCES

Space Aeronautics, vol. 37, No. 2, February 1962, pages 64–69.

L. DEWAYNE RUTLEDGE, *Primary Examiner.*

REUBEN EPSTEIN, LEON D. ROSDOL, *Examiners.*

R. L. GOLDBERG, R. L. GRUDZIECKI,
*Assistant Examiners.*